US011168782B2

(12) United States Patent
Dziuba et al.

(10) Patent No.: US 11,168,782 B2
(45) Date of Patent: Nov. 9, 2021

(54) LUBRICATION SYSTEMS FOR TRANSMISSIONS

(71) Applicant: Sikorsky Aircraft Corporation, Stratford, CT (US)

(72) Inventors: Dylan I. Dziuba, Milford, CT (US); John J. Baldyga, Wallingford, CT (US); Guy Juan Montoro, North Haven, CT (US); David Ramonas, Naugatuck, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 352 days.

(21) Appl. No.: 15/750,784

(22) PCT Filed: Jul. 20, 2016

(86) PCT No.: PCT/US2016/043059
§ 371 (c)(1),
(2) Date: Feb. 6, 2018

(87) PCT Pub. No.: WO2017/027180
PCT Pub. Date: Feb. 16, 2017

(65) Prior Publication Data
US 2018/0223984 A1    Aug. 9, 2018

Related U.S. Application Data

(60) Provisional application No. 62/202,541, filed on Aug. 7, 2015.

(51) Int. Cl.
*F16H 57/04* (2010.01)
*F01M 1/16* (2006.01)
(Continued)

(52) U.S. Cl.
CPC ......... *F16H 57/0442* (2013.01); *F01M 1/16* (2013.01); *F01M 1/20* (2013.01); *F16H 57/0438* (2013.01);
(Continued)

(58) Field of Classification Search
CPC ............ F16H 57/0442; F16H 57/0438; F16H 57/0456; F01M 1/16; F01M 1/20; F16N 7/38; F16N 13/22; F16N 29/02
See application file for complete search history.

(56) References Cited

U.S. PATENT DOCUMENTS 5,080,195 A * 1/1992 Mizumoto .......... F16C 33/6622
184/104.1
5,189,929 A * 3/1993 Chory .................... B64C 27/12
184/6.12

(Continued)

FOREIGN PATENT DOCUMENTS

EP        0374958 A2    6/1990

OTHER PUBLICATIONS

Patent Cooperation Treaty (PCT) International Search Report dated Oct. 5, 2016 for International Application No. PCT/US16/43059.
(Continued)

*Primary Examiner* — Michael A Riegelman
(74) *Attorney, Agent, or Firm* — Michael Best & Friedrich LLP

(57) ABSTRACT

A lubrication system for a transmission includes a flow-metering device and a controller. The controller is operatively associated with the flow-metering device to cause the flow-metering device to intermittently issue lubricant from the flow-metering device into a transmission based on an operating parameter of the transmission.

10 Claims, 4 Drawing Sheets

(51) Int. Cl.
*F01M 1/20* (2006.01)
*F16N 7/38* (2006.01)
*F16N 13/22* (2006.01)
*F16N 29/02* (2006.01)
*B64C 27/12* (2006.01)

(52) U.S. Cl.
CPC .......... *F16H 57/0456* (2013.01); *F16N 7/38* (2013.01); *F16N 13/22* (2013.01); *F16N 29/02* (2013.01); *B64C 27/12* (2013.01); *F16H 57/0479* (2013.01); *F16N 2210/08* (2013.01); *F16N 2250/00* (2013.01); *F16N 2250/08* (2013.01); *F16N 2250/40* (2013.01); *F16N 2260/00* (2013.01)

(56) References Cited

U.S. PATENT DOCUMENTS

| | | | | |
|---|---|---|---|---|
| 5,662,188 | A * | 9/1997 | Ito ............................ | B62D 5/07 184/11.1 |
| 6,817,448 | B2 * | 11/2004 | Maret ..................... | B64C 27/14 184/6.26 |
| 8,651,240 | B1 * | 2/2014 | Motto ..................... | F01D 25/18 184/7.4 |
| 9,765,875 | B2 * | 9/2017 | Sheridan ............. | F16H 57/0482 |
| 10,544,717 | B2 * | 1/2020 | Waddleton ............. | F01M 11/10 |
| 2002/0195296 | A1 | 12/2002 | Maret et al. | |
| 2003/0230274 | A1 * | 12/2003 | Williams ................. | F01M 1/02 123/196 R |
| 2007/0261922 | A1 * | 11/2007 | Mullen ................... | B64C 27/14 184/6.12 |
| 2009/0071753 | A1 * | 3/2009 | Carnelli ................ | B64C 27/006 184/6.4 |
| 2012/0227820 | A1 * | 9/2012 | Poster ..................... | F01M 1/18 137/1 |
| 2013/0074629 | A1 * | 3/2013 | Huikko ............... | F16H 57/0413 74/467 |
| 2014/0048355 | A1 * | 2/2014 | Pfleger ................ | F16H 57/0435 184/26 |
| 2016/0123456 | A1 * | 5/2016 | Goujet ................... | B64C 27/12 184/6.4 |
| 2016/0215652 | A1 * | 7/2016 | Mastro .................... | F01D 25/20 |
| 2016/0305284 | A1 * | 10/2016 | Mastro .................... | F01D 25/20 |
| 2017/0114784 | A1 * | 4/2017 | Parnin ..................... | F01D 25/20 |
| 2017/0175875 | A1 * | 6/2017 | Lapeyre ................. | F16N 39/04 |
| 2018/0106360 | A1 * | 4/2018 | Gmirya ............... | F16H 57/0434 |
| 2018/0223984 | A1 * | 8/2018 | Dziuba, I ............ | F16H 57/0438 |

OTHER PUBLICATIONS

Extended European Search Report; EP 16835602.0, dated Nov. 30, 2018; 9 pages.

European Office Action for European Application No. 16835602.0 dated Apr. 7, 2020 (pp. 1-7).

* cited by examiner

LUBRICATION SYSTEMS FOR TRANSMISSIONS

CROSS-REFERENCE TO RELATED APPLICATIONS

This application is the national phase under 35 U.S.C. § 371 of PCT International Application No. PCT/US2016/043059, filed Jul. 20, 2016, which claims the benefit of priority under 35 U.S.C. § 119(e) to U.S. Provisional Application No. 62/202,541, filed Aug. 7, 2015, the contents of which is incorporated herein by reference in its entirety.

BACKGROUND OF THE INVENTION

1. Field of the Invention

The present disclosure relates to transmissions, and more particularly to lubrication systems such as in transmissions for rotary wing aircraft.

2. Description of Related Art

Rotary wing aircraft typically utilize rotor drive transmissions to transfer mechanical rotation from one or more engines to the aircraft rotor system. Rotor drive transmissions typically employ transmission elements like gears and bearings that generate heat due to friction, generally from sliding contact between surfaces of various transmission elements. The heat is removed by the transmission lubrication system, which generally provides lubricant to transmission elements to reduce friction and limit wear as well as to remove heat. Because transmission operation under reduced lubricant flow conditions can accelerate wear of certain transmission elements, regulatory agencies like the Federal Aviation Administration (FAA) in the United States require that, unless the probability of reduced lubricant flow can be demonstrated to be extremely remote, that it be shown by test that any failure which results in loss of lubricant in any normal use lubrication system will not prevent continued safe operation, although not necessarily without damage, at a torque and rotational speed prescribed by the applicant for continued flight, for at least thirty (30) minutes after perception by the flight crew of the lubrication system failure or loss of lubricant. These requirements are commonly satisfied with system features like additive injection, glycol cooling, and/or lubricant misting.

Such conventional methods and systems have generally been considered satisfactory for their intended purpose. However, there is still a need in the art for improved lubrication systems. The present disclosure provides a solution for this need.

SUMMARY OF THE INVENTION

A transmission lubrication system includes a controller connected to one or more sensors and one or more flow-metering devices. A feedback loop connects the one or more sensors to the controller to provide the controller with information relating to one or more transmission operating parameters. The controller is operatively connected to the one or more flow-metering devices to intermittently issue lubricant to the transmission element for husbanding lubricant available for issue to the transmission element.

In certain embodiments, the flow-metering device can be connected to the lubricant source through a conduit. A lubricant pressurization device, such as a lubricant pump or pressurized bladder, can be disposed between the flow-metering device and the lubricant reservoir. A manifold can be disposed between the lubricant reservoir and the flow-metering device. The flow-metering device can be in selective fluid communication with the transmission through the lubricant conduit. The lubricant conduit can include a plurality of module trunks, and each module trunk can include a plurality of lubricant outlets for issuing lubricant to transmission elements of a given transmission module. One or more of the outlet can include a lubricant jet opposing a transmission element for issuing lubricant toward the transmission element. In an exemplary embodiment the lubricant conduit includes flow-metering devices and trunks with a plurality of outlets for one or more of an input module, a main module, and a take-off module of a rotorcraft main gearbox assembly.

In accordance with certain embodiments, the controller can be configured to intermittently issue lubricant using the one or more of the flow-metering devices. The flow-metering device may include a solenoid, an actuated valve, a variable orifice, or any other suitable device operably connected to the controller. The controller can be configured to intermittently issue lubricant using the lubricant pump, such as by varying pump output pressure or mass flow rate. The controller can be configured to intermittently issue lubricant using both the lubricant pump and the flow-metering device. In an exemplary embodiment, the controller is configured to receive data from the sensor relating to lubricant flow through a primary lubricant system, initiate lubricant flow from the lubricant reservoir to the flow-metering device using the pump, and intermittently issue lubricant using the flow-metering device.

It is also contemplated that the operating parameter of the transmission can include a parameter relating to a transmission element, such as the temperature of a bearing or gear. The operating parameter can include a parameter relating to the primary lubrication system of the transmission, such as lubricant flow rate, temperature, and/or mass flow rate. The operating parameter can include a parameter relating to the secondary lubrication system of the transmission, such as lubricant flow rate, temperature, mass flow rate, and/or lubricant level in the secondary lubricant reservoir.

A method of lubricating a transmission includes receiving a parameter for lubricant flow from a primary lubrication system to a transmission element, fluidly isolating a secondary lubrication system from the transmission element if the parameter is below a predetermined value, and intermittently issuing lubricant from the secondary lubrication system to the transmission element if the parameter is above the predetermined value. In embodiments, intermittently issuing lubricant is based on a predetermined schedule. In certain embodiments, intermittently issuing lubricant is based upon the received operating parameter.

These and other features of the systems and methods of the subject disclosure will become more readily apparent to those skilled in the art from the following detailed description of the described embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
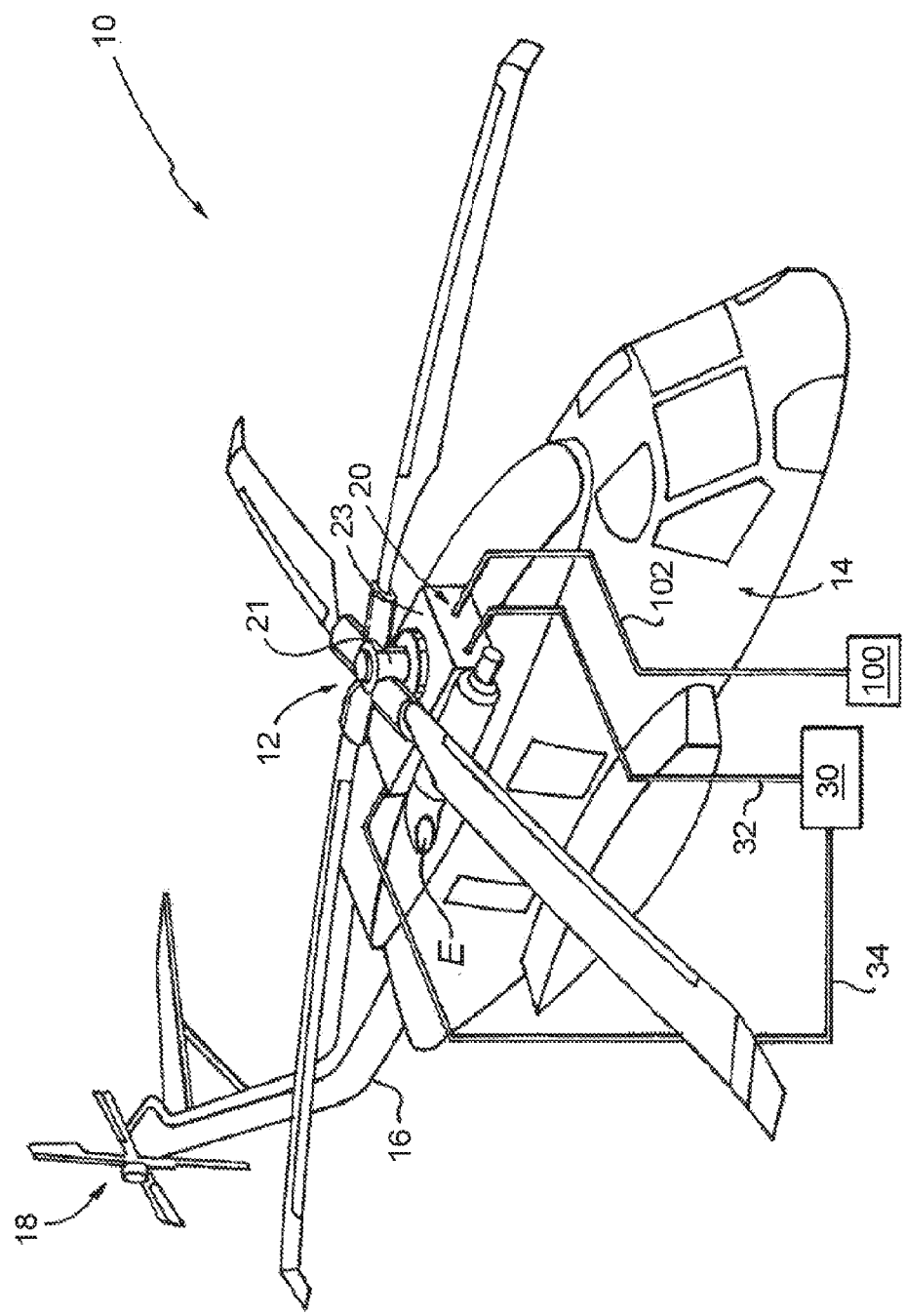
FIG. 1 is a schematic view of an exemplary embodiment of a rotary wing aircraft constructed in accordance with the present disclosure, showing a gearbox with primary and secondary lubrication systems.

Reference will now be made to the drawings wherein like reference numerals identify similar structural features or aspects of the subject disclosure. For purposes of explanation and illustration, and not limitation, a partial view of an exemplary embodiment of a lubrication system in accordance with the disclosure is shown in FIG. 1 and is designated generally by reference character 100. Other embodiments of lubrications systems and methods of lubricating transmission elements in accordance with the disclosure, or aspects thereof, are provided in FIGS. 2-4, as will be described. The systems and methods described herein can be used for aircraft transmissions, such as gearboxes for rotary wing aircraft like helicopters, however the invention is not limited to a particular type of aircraft or to aircraft in general.

Referring now to FIG. 1, a rotary wing aircraft 10 is shown. Rotary wing aircraft 10 includes a main rotor system 12, an airframe 14 with a longitudinally extending tail 16, and a tail rotor system 18 such as an anti-torque system mounted to tail 16. Main rotor assembly 12 is driven through a main power transmission gearbox 20 by one or more engines E. A primary lubricant system 30 is in fluid communication with gearbox 20 through a primary lubricant supply conduit 32 and primary lubricant return conduit 34 coupled to one another. A secondary lubrication system 100 is in selective fluid communication with gearbox 20 through a secondary lubricant conduit 102. In the illustrated exemplary embodiment secondary lubrication system 100 is independent (i.e. fluidly isolated) from primary lubrication system 30. While shown as exterior to the airframe 14 for purposes of explanation, it is understood that the gearbox 20, housing 23, primary lubrication system 30 and secondary lubrication system 100, and lubricant conduits 32, 34, and 102 are disposed within the airframe 14. Although a particular rotary wing aircraft configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, will also benefit from the present invention.

Gearbox 20 carries torque from the engines E through a multitude of gear train paths to a main rotor shaft 21 of main rotor system 12. Transmission elements grouped as modules (shown in FIG. 2) are disposed within a gearbox housing 23, which at least partially support the main rotor shaft 21. As described, gearbox 20 includes highly loaded torque transmitting gears and bearings that require lubricant for reliable operation. However, it will be appreciated that the teachings and disclosure related herein are applicable to any transmission system that may be called upon to transit mechanical rotation with reduced lubricant flow or in an oil-out condition.

Figure 2:
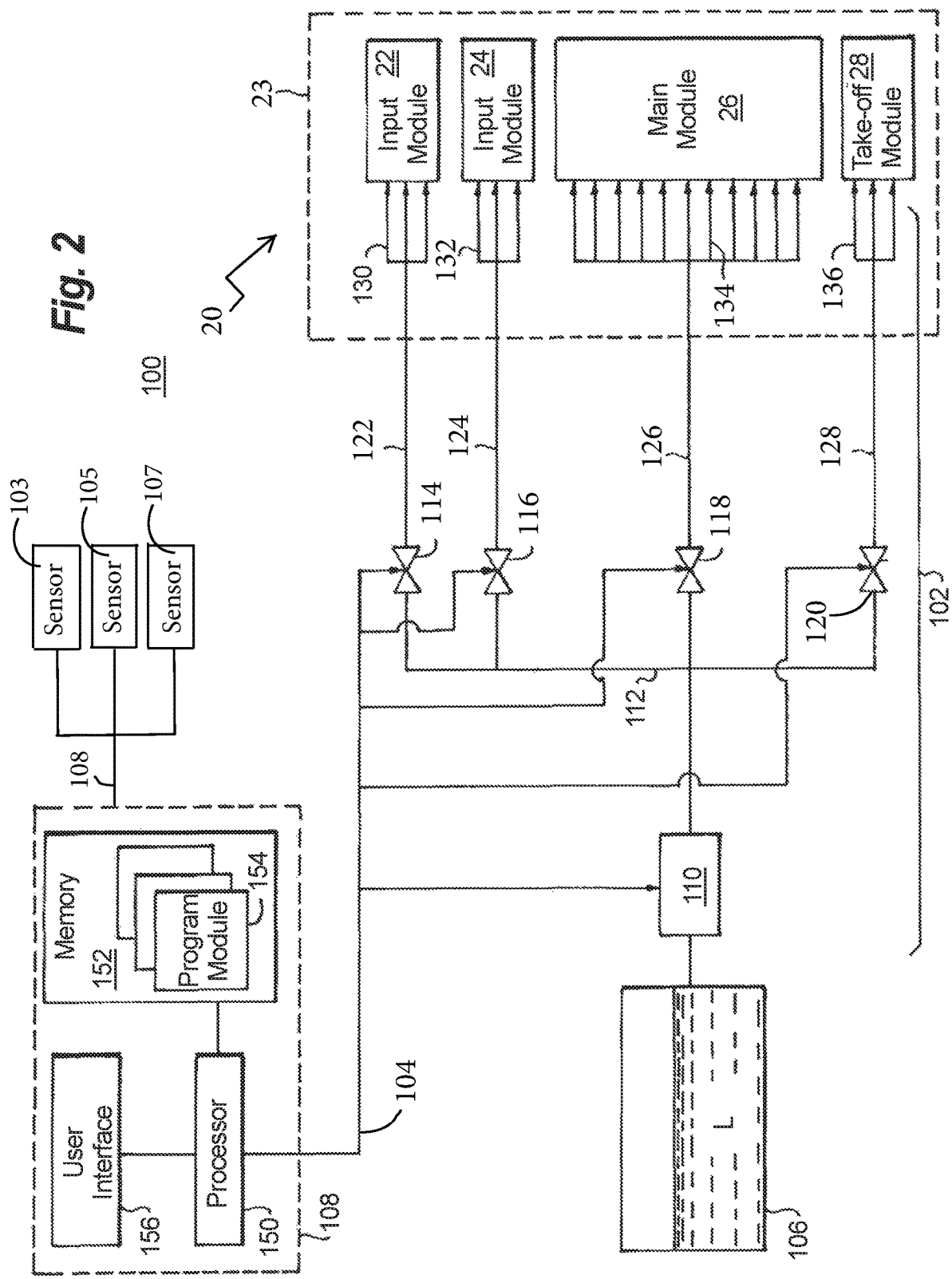
FIG. 2 is a schematic view of the secondary lubrication system of the rotary wing aircraft of FIG. 1, showing elements of the secondary lubrication system.

With reference to FIG. 2, secondary lubrication system 100 and gearbox 20 are shown. Secondary lubrication system 100 generally includes secondary lubricant conduit 102, lubricant reservoir 106, lubricant pump 110, and controller 108. Gearbox 20 generally includes lubricated transmission elements disposed within housing 23 and grouped as a first input module 22, a second input module 24, a main module 26, and a takeoff module 28. First input module 22 and second input module 24 receive mechanical rotation from one or more engines E (shown in FIG. 1) and apply the input mechanical rotation to main module 26. Main module 26 receives the input mechanical rotation and distributes the mechanical rotation to main rotor system 12 (shown FIG. 1) and tail rotor system 18 (shown in FIG. 1). As will be appreciated by those of skill in the art, gearbox 20 may include fewer or additional lubricated transmission elements, such as an accessory module, as suited for a given application.

The secondary lubrication system 100 includes secondary lubricant conduit 102. Secondary lubricant conduit 102 is connected to a lubricant pressurization device, which is configured to selectively pressurize and provide lubricant to secondary lubricant conduit 102. Although described further below as lubricant pump 110, it is to be understood and appreciated that lubricant pump 110 may, alternatively or additionally, include a pressurized lubricant bladder, a venturi, a bleed air pressurization device, or any other device suitable for pressurizing lubricant.

Upstream of secondary lubricant conduit 102, lubricant reservoir 106 is connected to secondary lubricant conduit 102 through lubricant pump 110. Lubricant reservoir 106 includes an "emergency" or secondary lubricant volume L retained therein for use as a secondary lubricant source in the event that lubricant supply from primary lubrication system 30 (shown in FIG. 1) is unavailable, such as during operation while in an oil-out condition. In this respect lubricant reservoir 106 is independent of primary lubrication system 30 (shown in FIG. 1), and is dedicated to secondary lubrication system 100 for use only under "emergency" conditions, for example when lubricant flow from primary lubrication system 30 drops below a predetermined level. As will be appreciated, primary lubrication system 30 (shown in FIG. 1) generally includes various primary system elements, such as pumps and the like, that are utilized to circulate lubricating oil from a primary oil reservoir into housing 23 and to other high friction locations to provide for effective operation of gearbox 20 and other system during normal operational conditions. The primary communication system elements need not be described in detail herein as various systems may be utilized in accordance with the principles of the present invention. Furthermore, it should be understood that various lubricating oils may also be used herewith, such as, for example, those described in DOD-L-85734 or MIL-PRF-23699, the disclosures of which are incorporated herein by reference.

Downstream of lubricant pump 110, secondary lubricant conduit 102 includes a lubricant manifold 112, flow-metering devices 114, 116, 118, and 120, trunks 122, 124, 126, and 128, and lubricant outlets 130, 132, 134, and 136. First input module flow-metering device 114 is connected to lubricant manifold 112, a first input module trunk 122 is connected to first input module flow-metering device 114, and first input module lubricant outlets 130 are connected to first input module trunk 122. A second input module flow-metering device 116 is connected to lubricant manifold 112, a second input module trunk 124 is connected to second input module flow-metering device 116, and second input module lubricant outlets 132 are connected to second input module trunk 124. A main module input module flow-metering device 118 is connected to lubricant manifold 112, a main module trunk 126 is connected to main module flow-metering device 118, and main module lubricant outlets 134 are connected to main module trunk 126. A take-off module flow-metering device 120 is connected to lubricant manifold 112, a take-off module trunk 128 is connected to take-off module flow-metering device 120, and take-off module lubricant outlets 136 are connected to take-off module trunk 128. As will be appreciated, the number and arrangement of flow-metering devices, trunks, and lubricant jets shown in the exemplary embodiment shown in FIG. 2 is for illustration purposes only, and that other arrangements are possible for different numbers of modules within the scope of the present disclosure.

One or more of lubricant outlets 130, 132, 134, and 136 may include a lubricant jet (illustrated with an arrow) to direct issued lubricant at a specific transmission element, improving lubricant distribution by limiting issue to transmission element contact surfaces. Flow-metering devices 114, 116, 118, and 120 include a device for controlling lubricant flow therethrough. For example, one or more of flow-metering devices 114, 116, 118, and 120 may include an actuated valve, a solenoid, a variable flow orifice, or a variable flow aperture plate for selectively allowing lubricant L through the respective flow-metering device.

Controller 108 is operatively connected through a communication bus 104 to flow-metering devices 114, 116, 118, and 120 to control lubricant flow therethrough. In this respect controller 108 includes a processor 150 communicative with a memory 152 having instructions recorded thereon in one or more program modules 154 that, when read by processor 150, cause processor 150 to perform certain actions. The actions may include intermittently open and close flow-metering devices 114, 116, 118, and 120 according to a schedule recorded on memory 152. The schedule may, for example, cause one or more of flow-metering devices 114, 116, 118, and 120 to open or close (or become less or more open), to provide discrete bursts of lubricant L from lubricant reservoir 106. Further, controller 108 can selectively adjust each of the flow-metering devices 114, 116, 118, and 120, thereby allowing, by way of example, an amount of lubricant L passing through first input flow-metering metering device 114 to be different from an amount of lubricant L passing through main module flow-metering device 118. Through selective actuation and control of the flow-metering devices 114, 116, 118, and 120, secondary lubrication system 100 thereby husbanding lubricant L contained within lubricant reservoir 106 to increase the operating interval afforded by lubricant L disposed within lubricant reservoir 106. Controller 108 is also shown to include a user interface 156.

Optionally, communication bus 104 may operably connect controller 108 to lubricant pump 110. In this respect one or more of program modules 154 recorded on memory 152 may, when read by processor 150, cause processor 150 to vary the output pressure of lubricant pump 110, such as by turning an impeller of lubricant pump 110 more rapidly or slowly to increase or decrease flow of lubricant L through lubricant pump 110. As will be appreciated, change in output pressure (or mass flow rate) may be in concert with intermittent issuances of lubricant L through flow-metering devices 114, 116, 118, and 120, output pressure (or mass flow rate) increasing when main module flow-metering device 118 opens relative to first input module flow-metering device 114, second input module flow-metering device 116, or take-off module flow-metering device 120, which have fewer lubricant outlets in the illustrated embodiment.

Optionally, a communication bus 101 may connect one or more sensors 103, 105, and 107 to controller 108. Sensor 103 may take the form of a reservoir sensor, sensor 105 may take the form of a primary lubrication system sensor, and sensor 107 may take the form of a transmission element sensor. For example, reservoir sensor 103 may be coupled to lubricant reservoir 106 and configured to provide data to controller 108 regarding the level of lubricant disposed therein. This allows controller 108 to tailor lubricant issued to transmission elements according a parameter indicative of lubricant remaining in lubricant reservoir 106. Primary lubrication system sensor 105 may be connected to primary lubrication system 30, thereby providing a parameter indicative of lubricant pressure, mass flow rate, and temperature to controller 108, enabling controller 108 to determine whether an oil-out condition exists and if initiating flow from secondary lubrication system 100 is warranted. Transmission element sensor 107 may be connected to gearbox 20 or elements disposed therein, thereby providing a parameter indicative of the lubricant need of a given transmission element. This allows controller 108 to tailor the amount of the lubricant issued through flow-metering devices 114, 116, 118, and 120 according to the actual (i.e. indicated) requirement of a given transmission element, thereby issuing lubricant according to a demonstrated need rather than on the basis of a prediction-based schedule.

Figure 3:
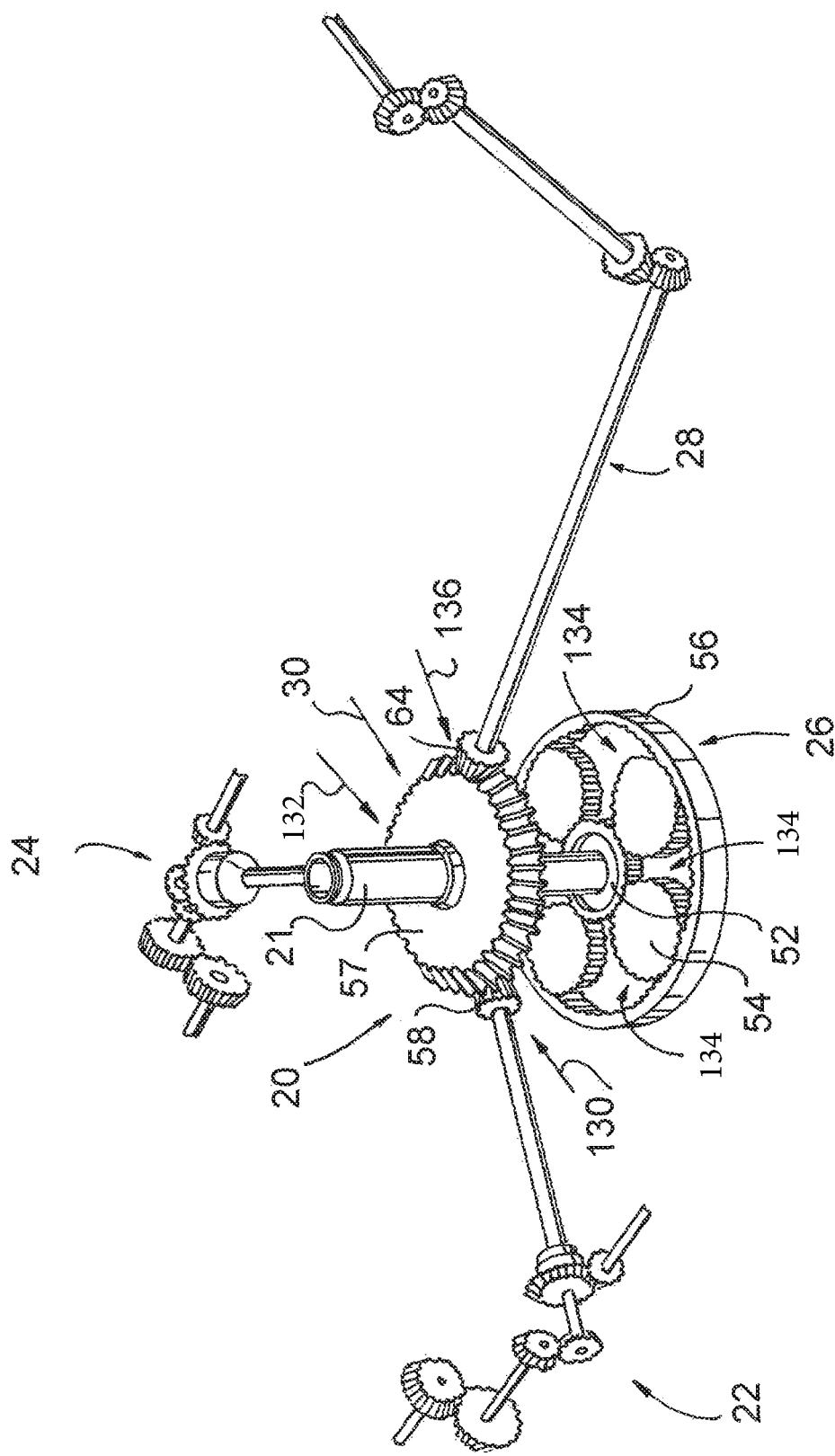
FIG. 3 is a schematic view of the secondary lubrication system and the gearbox of the rotary wing aircraft of FIG. 1, showing lubricant outlets arranged about transmission elements.

With reference to FIG. 3, gearbox 20, primary lubrication system 30, and secondary lubrication system 100 are shown according to an exemplary embodiment. Main module 26 includes a planetary gear arrangement with a sun gear 52, a fixed ring gear 56, and a plurality of planetary gears 54 intermeshed between sun gear 52 and ring gear 56. Main rotor shaft 21 connects sun gear 52 with a main input bevel gear 57. First input module 22 includes an input pinon 58 that intermeshes with main input bevel gear 57, thereby providing input rotational energy from engine E (shown in FIG. 1) to main module 26, and main rotor system 12 (shown in in FIG. 1) through main rotor shaft 21. Second input module 24 is similarly arranged with the difference that it provides rotational energy to main module 26 from a separate engine (not shown for clarity reasons) through a separate input pinion gear (not shown for clarity reasons). Takeoff module 28 includes a takeoff pinion gear 64 intermeshed with main input bevel gear 57 for distributing rotational energy to tail rotor system 18 (shown in FIG. 1).

First input module lubricant outlets 130 are fluidly coupled to first input module flow-metering device 114 (shown in FIG. 2), and are oriented toward teeth of main input bevel gear 57 proximate the location where they contact the teeth of the input pinion of second input module 24. This allows for issuing lubricant L directly at the location at which teeth of main input bevel gear 57 intermesh with teeth of first input module input pinion 58. Issuing lubricant L proximate the location wherein the teeth intermesh reduces the likelihood that the issued lubricant L is slung from main input bevel gear 57 prior to reaching the location where teeth intermesh, improving the effectiveness of issued lubricant L. Second input module lubricant outlets 132 of second input module 24 and takeoff module 28 may also be positioned proximate intermeshed gear teeth, providing similar benefits. Intermittently issuing lubricant L, such as in response to the input torque provided by a given input module, can provide further efficiency in usage of lubricant L.

Main module lubricant outlets 134 fluidly coupled to main module flow-metering device 118 (shown in FIG. 2) are similarly oriented toward locations where teeth intermesh, for example at locations where teeth of planetary gears 54 intermesh with ring gear 56 and/or with sun gear 52. Since these locations are located below main input bevel gear 57 during normal level flight, lubricant L issued from first input module lubricant outlets 130 and second input module lubricant outlets 132 tends to flow to these locations subsequent to traversing main input bevel gear 57. As will be appreciated, this flow can change due to various factors including aircraft attitude, pitch, and yaw. Accordingly, tailoring lubricant flow according a measured need allows for issuing lubricant through main module lubricant outlets 134 efficiently, for example by reducing issue frequency when the aircraft is in normal flight, and increasing issue frequency when the attitude of the aircraft causes lubricant traversing main input bevel gear 57 to be directed elsewhere within gearbox 20.

Figure 4:
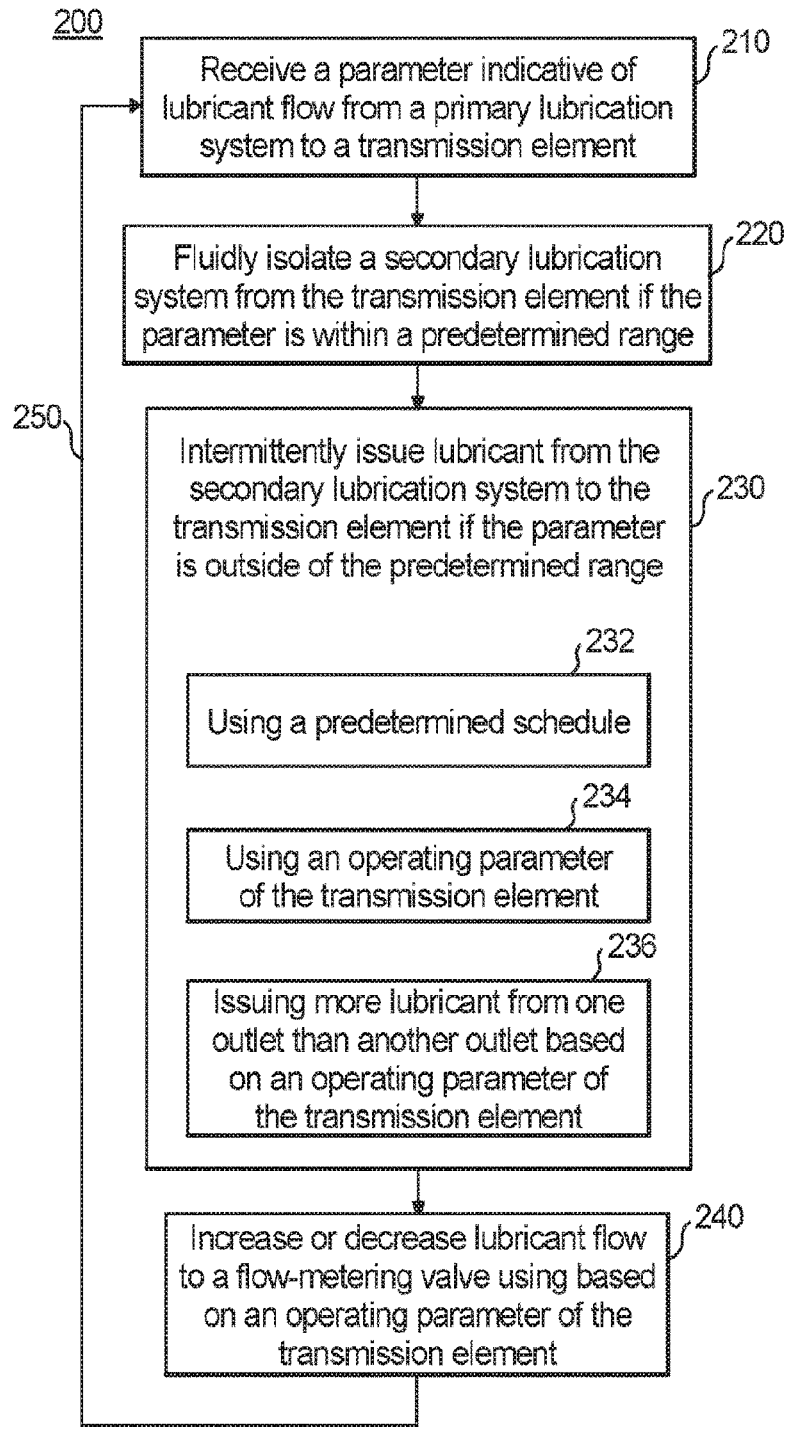
FIG. 4 is schematic diagram of a method of lubricating a transmission using a secondary lubrication system by intermittently issuing lubricant to transmission elements from the secondary lubrication system.

With reference to FIG. 4, a method 200 of lubricating a transmission is shown. Method 200 includes determining whether a transmission lubricant flow, e.g. a lubricant flow from primary lubrication system 30 (shown in FIG. 1), is below a predetermined level, as shown with box 210. This can include use of a sensor, e.g. primary lubrication system sensor 105 (shown in FIG. 2), operatively coupled to the primary lubricant system or transmission and communicative with a controller of the secondary lubrication system, e.g. controller 108 (shown in FIG. 2).

Method 200 also includes fluidly isolating the transmission, e.g. gearbox 20, from a secondary lubrication system reservoir, e.g. lubricant reservoir 106 (shown in FIG. 2), when the lubricant flow is above the predetermined flow level as shown with box 220. Method 200 further includes issuing lubricant through a flow-metering device, e.g. one or more of flow-metering devices 114, 116, 118, and 120 (shown in FIG. 2), intermittently when the lubricant flow is below the predetermined flow level as shown with box 230. Issuing the lubricant intermittently allows for delivering sufficient lubricant to satisfy the FAA requirement for minimum duration during an oil-out condition while minimizing the amount of lubricant necessary for sequester within the lubricant reservoir. As will be appreciated, it also enables extending the operating interval to beyond the minimum required for a given amount of lubricant within the lubricant reservoir.

Lubricant can be issued from more than one flow-metering device according to a predetermined schedule, as shown with box 232. Lubricant may also be issued based on an operating parameter of the transmission element as indicated in box 234. The flow issued from one of the flow-metering devices can be greater than that issued by another of the flow-metering devices, as shown with box 236. As shown with box 240, lubricant flow to the flow-metering devices can be varied e.g., increased and or decreased, by changing supply pressure or flow rate with a pump, e.g. lubricant pump 110 (shown in FIG. 2). As indicated with arrow 250, the illustrated steps can be performed iteratively as a set as part of a monitoring scheme during operation of the transmission. And although particular order of operations are shown, described, and claimed, it should be understood that steps may be performed in any order, separated or combined unless otherwise indicated and will still benefit from the present invention.

The methods and systems of the present disclosure, as described above and shown in the drawings, provide for transmissions with superior properties including improved reliability during operation in an oil-out condition. While described in the context of a rotary wing helicopter and FAA requirements, in is understood that aspects of the invention can be used which meet other requirements, and can be used in other types of machinery, including industrial machinery, automobiles, maritime machinery, locomotives, without restriction. While the apparatus and methods of the subject disclosure have been shown and described with reference to certain embodiments, those skilled in the art will readily appreciate that changes and/or modifications may be made thereto without departing from the scope of the subject disclosure.

What is claimed is:

1. A transmission lubrication system for a transmission, comprising:
a primary lubrication system fluidically connected to the transmission, the primary lubrication system including a primary lubricant supply and a primary lubricant conduit; and
a secondary lubrication system fluidically connected to the transmission, the secondary lubrication system including a secondary lubricant conduit having a flow-metering device connected between a lubricant reservoir and a transmission element requiring lubrication, and a lubricant outlet fluidically connected downstream from the flow metering device, the secondary lubricant conduit being fluidically isolated from the primary lubrication conduit during an entirety of an operation of the lubrication system; and
a controller operatively associated with the flow-metering device, wherein the controller is configured to cause the flow-metering device to issue lubricant intermittently from the lubricant reservoir to the transmission element based on an operating parameter of the transmission indicative of the primary lubrication system not providing sufficient lubrication to the transmission element.

2. The lubrication system as recited in claim 1, wherein the operating parameter includes one of lubricant mass flow rate, lubricant temperature, or lubricant pressure in a primary lubrication system of the transmission.

3. The lubrication system as recited in claim 1, further including a plurality of lubricant jets connected by a lubricant conduit to the flow-metering device.

4. The lubrication system as recited in claim 3, wherein at least one of the plurality of lubricant jets is co-located with a lubricant jet of a primary lubrication system.

5. The lubrication system as recited in claim 1, wherein the flow-metering device is a first flow-metering device, and further including a second flow-metering device connected between the lubricant reservoir and another transmission element, wherein the controller is further operatively associated with the second flow-metering device, wherein the controller is configured to cause the first and second flow-metering device to issue lubricant intermittently from the lubricant reservoir to the transmission elements based on an operating parameter of the transmission.

6. The lubrication system as recited in claim 5, further including a manifold connected between the first and second flow-metering devices and the lubricant reservoir.

7. The lubrication system as recited in claim 1, further comprising a pump in fluid communication with the flow-metering device.

8. The lubrication system as recited in claim 7, wherein the controller is operatively associated with the pump to vary lubricant pressure provided to the flow-metering device.

9. The lubrication system as recited in claim 1, wherein the controller is configured to cause the flow-metering device to intermittently issue lubricant subsequent initiating lubrication of the transmission using the secondary lubrication system.

10. The lubrication system as claim 1, wherein the transmission is a transmission for a rotary wing aircraft.

* * * * *